Dec. 6, 1949  C. W. BAUBERGER  2,490,726
FAUCET MIXING VALVE
Filed May 9, 1946  2 Sheets-Sheet 1

INVENTOR.
CHARLES W. BAUBERGER
BY
ATTORNEY

Dec. 6, 1949
C. W. BAUBERGER
2,490,726
FAUCET MIXING VALVE
Filed May 9, 1946
2 Sheets-Sheet 2
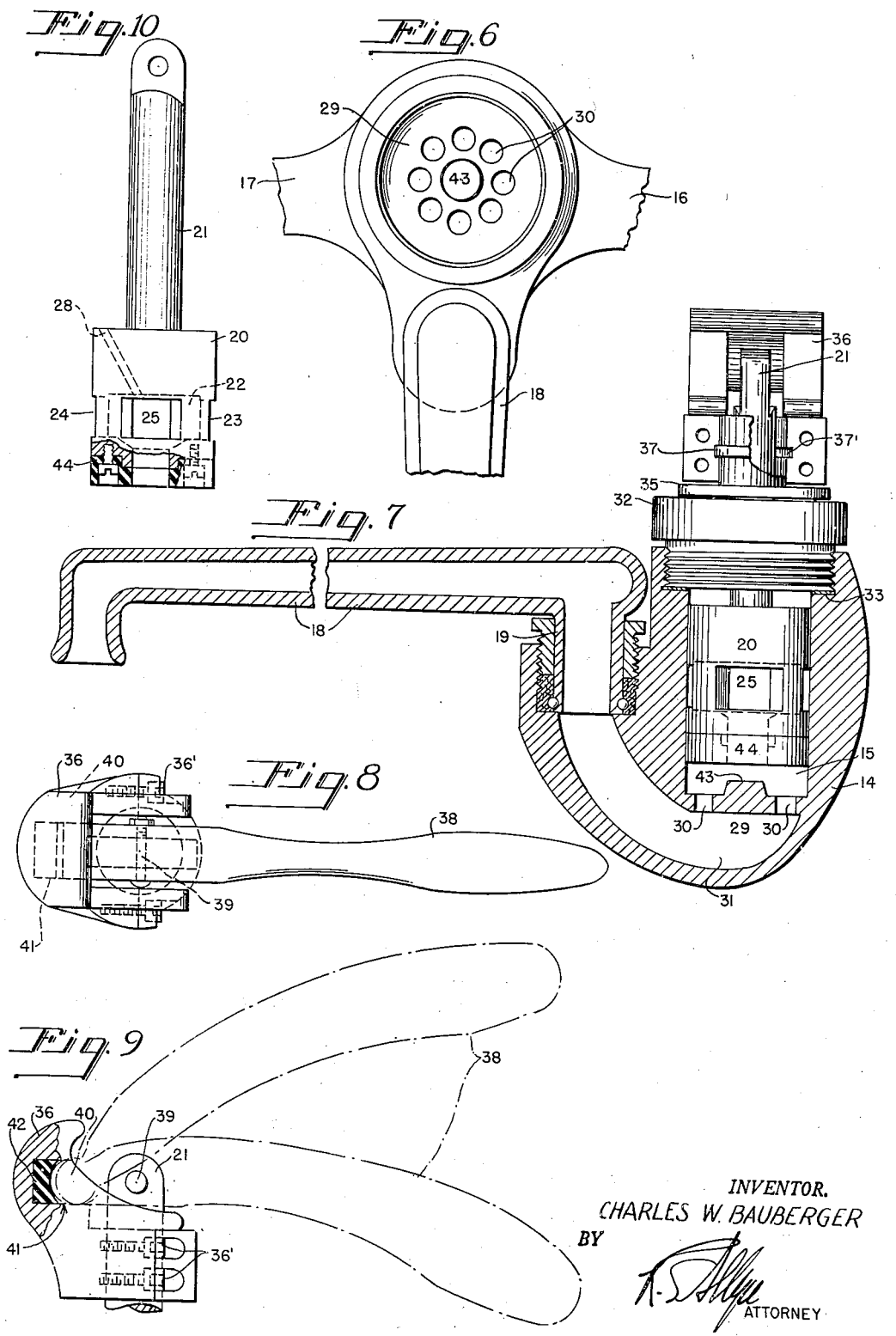
INVENTOR.
CHARLES W. BAUBERGER
BY
ATTORNEY Patented Dec. 6, 1949

2,490,726

UNITED STATES PATENT OFFICE 2,490,726

FAUCET MIXING VALVE

Charles W. Bauberger, Malverne, N. Y.

Application May 9, 1946, Serial No. 668,410

6 Claims. (Cl. 251—4)

This invention relates to faucets with mixing valves for mixing hot and cold water supply lines such as are generally provided for use in kitchens, bath rooms, laundries and lavatories.

It is a primary object of this invention to provide a simple valve of this character having a single actuating member for controlling the mixture, the amount of flow and the discharge of the water.

Another object is to eliminate the necessity for springs and other parts that usually give trouble due to wear and looseness incident to the use of the faucet.

A further object is to provide a valve of this kind that is simple and rugged in construction, inexpensive to manufacture and highly efficient in use.

Broadly the invention comprises a casing having a valve which is vertically movable and also rotatable for controlling the passage of either hot or cold water or any relative proportion of hot water with respect to the cold water. In its normal shut-off position, the valve may be rotated from the cold water supply position to the hot water supply position without opening the valve. By vertically adjusting the height of the valve either hot or cold water or any proportion of the two may be discharged depending upon the rotation of the valve. The volume of flow will depend upon the vertical height of the valve.

Fig. 6 is a plan view of the housing with its inlet, the movable valve parts being omitted.

Fig. 7 is a vertical sectional view of the housing on the plane of the line 7—7 of Fig 6.

Fig. 8 is a plan view of the handle and the head to which it is hinged.

Fig. 9 is a side view and partial section of the head and showing the handle in dot-dash lines.

Fig. 10 is a side view of the valve per se.

Figure 1:
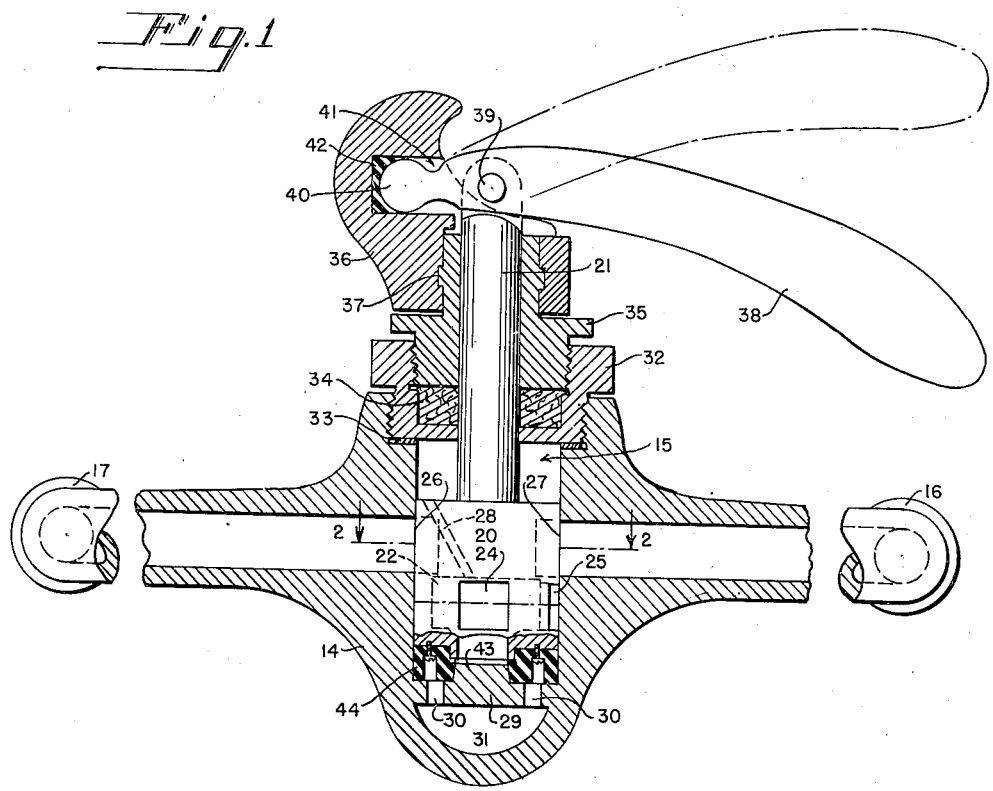
Fig. 1 is a front view and partial section of a mixing valve faucet construction involving one form of my invention, the valve being in the shut-off position for cold water.
Figure 2:
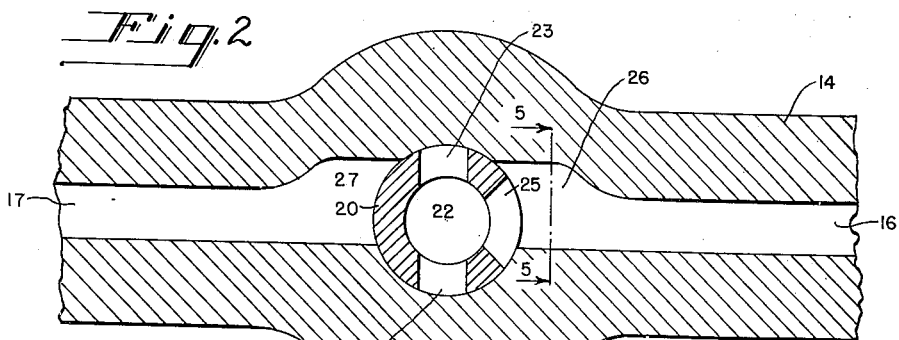
Fig. 2 is a plan and section showing the valve per se in the position for delivering cold water only.
Figure 3:
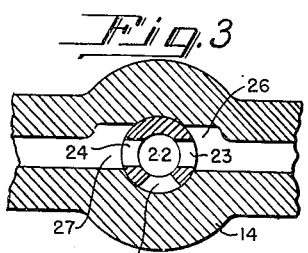
Fig. 3 is a plan and section showing the valve per se in the position for mixing equal parts of hot and cold water.
Figure 4:
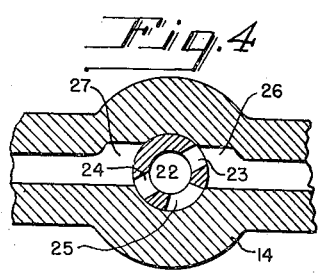
Fig. 4 is a plan and section showing the valve per se in the position for delivering both hot and cold water with the cold water in excess.
Figure 5:
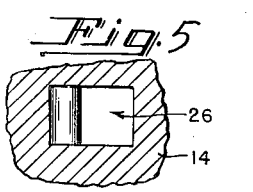
Fig. 5 is a cross-sectional view showing the water passage on the plane of the line 5—5 of Fig. 2.

The casing 14 may be of any suitable external design and has a valve chamber 15 with cold and hot water inlet branches 16 and 17 for installation in the usual way. The water outlet faucet 18 may be hinged to the casing at 19 in any suitable manner.

The valve 20 per se is cylindrical and has a stem 21. They are reciprocable vertically and rotatable within the chamber 15. The valve has a recess 22 with entrance passages 23, 24 and 25 which are preferably square in cross-section. The inlets 26 and 27 in the casing which lead to the valve are preferably rectangular in cross-section and located with respect to the passages in the valve so as to ensure as nearly as possible a uniform rate of increase or decrease in the hot and cold flow as the valve is turned. A relief outlet 28 from the recess 22 to the chamber 15 permits the valve to be moved up and down in the chambers without creating a compression or suction.

The floor 29 of the chamber has openings 30 leading to the passage 31 and the discharge outlet 18. A packing gland 32 is screwed into the upper part of the casing upon a washer 33 and guides the stem 21 of the valve and contains packing material 34. A collar 35 is screwed into the upper part of the gland 32 against the packing 34. The head 36 is split in two parts held together by screws 36' so as to enable it to be mounted to rotate on the bead 37 of collar 35 and yet prevent its vertical movement on the stem 21.

A groove 37' is formed in the part 36 to receive the bead 37.

A handle 38 is pivoted at 39 on the upper end of the valve stem and has a projection 40 which extends into a recess 41 in the head 36. A resilient buffer 42, for instance of soft rubber, is located in this recess and acts to afford a sort of toggle action on the end of the handle so as to hold the handle and the valve and its stem in the lowest position. This buffer 42 may be arranged to afford a toggle action to hold the valve in its highest position. The floor plate preferably has a central boss 43 and a washer 44 on the valve fits on the floor plate around the boss and effectively closes off the outlet.

The valve is rotatable in its lowest or highest position or at any intervening angle of rotation. In its lowest position, it may be rotated without opening the valve. In the extreme right hand position, when the valve is raised cold water will flow. When in the left hand position, hot water will flow when the valve is raised. When the valve is raised and rotated to its central position equal quantities of hot and cold water will flow and the higher the valve is lifted the greater will be the flow. In between the extreme positions, the flow will be greater or less and the proportions of hot and cold water will vary depending upon the vertical height and the angular position of the valve.

The weight of the valve and the handle tends to keep the valve closed as there is no vertical pressure of the water in the system against the valve. When the valve is partly open there is of course vertical pressure upon the valve in the lower part of the valve chamber but the resistance in the discharge faucet being less than the pressure the valve will remain stationary.

I claim:

1. A faucet mixing valve comprising a casing having a valve chamber with two entrances and an exit, a valve and stem rotatable and reciprocable in said chamber, said valve having a central recess with three entrances in its periphery adapted to register with the entrances in the casing and, an exit at the lower end adapted to communicate with the exit from the casing when the valve is raised, a washer carried by the valve around the valve exit and adapted to close the exit from the casing when the valve is lowered, a packing gland secured to the casing around said valve stem, a collar adjustable in said packing gland, a head mounted to rotate on said collar, means for preventing the rising of the head on the collar, said head having a lateral recess, a handle hinged to the valve stem and having a projection extending into said recess and a resilient buffer in said recess between the projection of the handle and the opposite wall of the recess in the head whereby the handle may be swung to raise and lower the valve and rotated to rotate the valve.

2. A mixing valve for a faucet comprising a casing having a valve chamber with two entrances and an exit, a valve and stem rotatable and reciprocable in said chamber, said valve having a central recess with three entrances in its periphery adapted to register with the entrances in the casing when the valve is raised and rotated, and having a relief passage extending from the central recess to the space in the chamber above the valve, said valve having an exit at the lower end adapted to communicate with the exit from the casing when the valve is raised, a washer carried by the valve around the valve exit and adapted to close the exit from the casing when the valve is lowered, a packing gland secured to the casing around said valve stem, a collar adjustable in said packing gland, a head mounted to rotate on said collar, means for preventing the rising of the head on the collar, said heading having a lateral recess, a handle hinged to the valve stem and having a projection extending into said recess whereby the handle may be swung to raise and lower the valve and rotated to rotate the valve.

3. A faucet mixing valve comprising a casing having a valve chamber with two entrances and an exit, a valve and stem rotatable and reciprocable in said chamber, said valve having a central recess with three entrances in its periphery adapted to register with the entrances in the casing and an exit at the lower end adapted to communicate with the exit from the casing when the valve is raised, a washer carried by the valve around the valve exit and adapted to close the exit from the casing when the valve is lowered, a rotatable head on said casing, means for preventing the rising of said head, said head having a lateral recess, a handle hinged to the valve stem and having a projection extending into said recess and a resilient buffer in said recess between the projection of the handle and the opposite wall of the recess in the head whereby the handle may be swung to raise and lower the valve and rotated to rotate the valve, the entrances in the valve and the entrances in the casing being rectangular in cross-section at the surfaces of contact between the valve and the casing.

4. A faucet mixing valve construction embodying a housing having a valve chamber with an outlet at the bottom and a centering projection and having inlets at opposite sides near the top of the chamber, a valve rotatable and vertically movable in said chamber and having a recess with two discrete inlets at opposite sides, an enlarged inlet between the discrete inlets and an outlet in the bottom, a washer carried by said valve surrounding said outlet and adapted to be centered by said projection and adapted to close the outlet from the valve chamber when the valve is depressed, a head rotatably carried by the housing and a lever hinged to the valve and having a fulcrum in said head.

5. A faucet mixing valve construction embodying a housing having a valve chamber with an outlet at the bottom and a centering projection and having inlets at opposite sides of the chamber, a valve rotatable and vertically movable in said chamber and having a recess with two discrete inlets at opposite sides, an enlarged inlet between the discrete inlets and an outlet in the bottom, a washer carried by said valve surrounding said outlet and adapted to be centered by said projection and adapted to close the outlet from the valve chamber when the valve is depressed, a head rotatably carried by the housing, a lever hinged to the valve and having a fulcrum in said head and a rubber buffer in the head for holding the valve in moved position.

6. A faucet mixing valve construction embodying a housing having a valve chamber with an outlet at the bottom and a centering projection and having inlets at opposite sides of the chamber, a valve rotatable and vertically movable in said chamber and having a recess with two discrete inlets at opposite sides, an enlarged inlet between the discrete inlets and an outlet in the bottom, a washer carried by said valve surrounding said outlet and adapted to be centered by said projection and adapted to close the outlet from the valve chamber when the valve is depressed, a head rotatably carried by the housing, a lever hinged to the valve and having a fulcrum in said head and resilient means in the head coacting with the end of the lever beyond the stem for holding the valve in its extreme position.

CHARLES W. BAUBERGER.

REFERENCES CITED

The following references are of record in the file of this patent:

UNITED STATES PATENTS

| Number | Name | Date |
| --- | --- | --- |
| 1,773,719 | Bentley | Aug. 26, 1930 |
| 1,882,953 | Saelzer | Oct. 18, 1932 |

FOREIGN PATENTS

| Number | Country | Date |
| --- | --- | --- |
| 59,843 | Norway | of 1933 |